US011225242B1

(12) United States Patent
Bolthouse et al.

(10) Patent No.: US 11,225,242 B1
(45) Date of Patent: Jan. 18, 2022

(54) HYBRID VEHICLE CONTROL WITH RATE-LIMITED ENERGY MANAGEMENT TORQUE

(71) Applicant: Ford Global Technologies, LLC, Dearborn, MI (US)

(72) Inventors: Alec Bolthouse, Dearborn, MI (US); Justin Panhans, Detroit, MI (US); Douglas Michael Smith, Ypsilanti, MI (US); Minku Lee, Ypsilanti, MI (US); Joshua Nicholas Dewalt, Canton, MI (US); Andrew E. Burt, Royal Oak, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/037,210

(22) Filed: Sep. 29, 2020

(51) Int. Cl.
| | |
|---|---|
| *B60W 20/15* | (2016.01) |
| *B60W 10/06* | (2006.01) |
| *B60W 10/08* | (2006.01) |
| *F02D 41/00* | (2006.01) |
| *B60K 6/547* | (2007.10) |
| *B60K 6/38* | (2007.10) |

(52) U.S. Cl.
CPC ............ *B60W 20/15* (2016.01); *B60W 10/06* (2013.01); *B60W 10/08* (2013.01); *F02D 41/0002* (2013.01); *B60K 6/38* (2013.01); *B60K 6/547* (2013.01); *B60W 2510/0638* (2013.01); *B60W 2510/244* (2013.01); *B60W 2540/10* (2013.01); *F02D 2200/101* (2013.01)

(58) Field of Classification Search
CPC ...... B60W 20/15; B60W 10/08; B60W 10/06; B60W 2510/244; B60W 2510/0638; B60W 2540/10; F02D 41/0002; F02D 2200/101; B60K 6/38; B60K 6/547
See application file for complete search history.

(56) References Cited

U.S. PATENT DOCUMENTS

| 10,112,598 | B1* | 10/2018 | Johri ...................... B60W 20/40 |
| 2008/0110439 | A1* | 5/2008 | Sugimoto .............. B60K 6/365 |
| | | | 123/478 |
| 2011/0021311 | A1* | 1/2011 | Kim ...................... B60W 30/19 |
| | | | 477/3 |
| 2011/0166730 | A1* | 7/2011 | Wang .................... B60W 20/13 |
| | | | 701/22 |
| 2013/0096761 | A1* | 4/2013 | Kuroda ................. B60W 20/10 |
| | | | 701/22 |
| 2015/0203092 | A1 | 7/2015 | Johri et al. |

(Continued)

*Primary Examiner* — Carl C Staubach
(74) *Attorney, Agent, or Firm* — Brooks Kushman PC; David Kelley

(57) ABSTRACT

A system and method for controlling a hybrid vehicle having an engine and a traction motor include operating the engine at an operating point selected based on system efficiency, operating the electric machine to provide an electric machine torque responsive to a difference between a driver demand torque and the engine torque associated with the operating point, and limiting a rate of change of the electric machine torque in response to a rate of change of the driver demand torque. The electric machine torque rate limit may vary continuously responsive to the rate of change of driver demand torque and whether the driver demand torque is increasing or decreasing.

20 Claims, 5 Drawing Sheets

(56) References Cited

U.S. PATENT DOCUMENTS

| | | | |
|---|---|---|---|
| 2017/0355360 A1* | 12/2017 | Reed | B60K 6/387 |
| 2017/0355361 A1* | 12/2017 | Yamazaki | B60K 6/46 |
| 2019/0211758 A1* | 7/2019 | Park | B60W 10/02 |
| 2020/0130672 A1* | 4/2020 | Oh | B60W 20/11 |
| 2020/0391723 A1* | 12/2020 | Syed | B60W 10/02 |

* cited by examiner

HYBRID VEHICLE CONTROL WITH RATE-LIMITED ENERGY MANAGEMENT TORQUE

TECHNICAL FIELD

The present disclosure relates to managing torque supplied by a traction motor and an engine in a hybrid vehicle.

BACKGROUND

Hybrid electric vehicles include an engine and an electric machine that may operate as a traction motor to propel the vehicle. When the engine is operating, the powertrain controller may attempt to operate the engine at its most efficient operating point to maximize overall powertrain efficiency while controlling energy management torque provided via the electric machine to supply powertrain output torque satisfying the driver demand. While electric machine torque can be quickly adjusted to compensate for transients in driver demand, significant changes in torque over a relatively short period of time while driver demand torque is relatively steady may impact vehicle drivability.

SUMMARY

A system and method for controlling a hybrid vehicle having an engine and a traction motor include operating the engine at an engine torque associated with an operating point selected based on current engine speed and system efficiency, which may include at least engine fuel efficiency, operating the electric machine to provide an electric machine torque responsive to a difference between a driver demand torque and the engine torque associated with the operating point, and limiting a rate of change of the electric machine torque in response to a rate of change of the driver demand torque. The electric machine torque rate limit may vary continuously in response to the rate of change of the driver demand torque. The rate limit may be selected or vary based on whether the driver demand torque is increasing or decreasing.

In one embodiment, a vehicle includes an engine, an electric machine selectively coupled by a first clutch to the engine, a step-ratio transmission selectively coupled by a second clutch to the electric machine, and a controller. The controller is programmed to operate the engine at an engine torque associated with an operating point selected based on system efficiency or engine fuel efficiency, current engine speed, and driver demand torque. The controller is programmed to operate the electric machine to provide an electric machine torque responsive to a difference between a driver demand torque and the engine torque associated with the operating point, and to limit a rate of change of the electric machine torque in response to a rate of change of the driver demand torque. The controller may limit the rate of change of the electric machine torque to a first rate in response to the rate of change of the driver demand torque being positive, and to limit the rate of change of the electric machine torque to a second rate in response to the rate of change of the driver demand torque being negative. The rate limit may be retrieved from a lookup table stored in a memory accessible by the controller and indexed by at least the rate of change of the driver demand torque. The rate limit may be retrieved from the lookup table based on the rate of change of the driver demand torque and whether the driver demand torque is increasing or decreasing. The controller may retrieve the rate limit from a first lookup table if the driver demand torque is increasing, and retrieve the rate limit from a second lookup table if the driver demand torque is not increasing.

Embodiments may include a vehicle having an engine, a traction battery, an electric machine selectively coupled by a first clutch to the engine and electrically coupled to the traction battery, an automatic step-ratio transmission having a plurality of selectable discrete gear ratios and a torque converter, the transmission selectively coupled by a second clutch to the electric machine, and a controller. The controller may be programmed to control at least engine manifold airflow to operate the engine at an engine torque associated with a selected engine operating point based at least in part on a driver demand torque, current engine speed, and a state-of-charge of the traction battery. The controller may also be programmed to control current flow to and from the electric machine to provide an electric machine torque responsive to a difference between the driver demand torque and the engine torque associated with the operating point, and to limit a rate of change of the electric machine torque based on the rate of change of the driver demand torque. The controller may be programmed to retrieve the rate limit from a lookup table stored in a memory in communication with the controller. The lookup table may be indexed by the rate of change of the driver demand torque. The driver demand torque may correspond to a position of the accelerator pedal. The controller may be programmed to retrieve the rate limit from a first lookup table in response to the driver demand torque increasing, and to retrieve the rate limit from a second lookup table in response to the driver demand torque decreasing.

Embodiments may also include a method for controlling a vehicle having an engine, and an electric machine coupled to a traction battery. The method performed at least in part by a vehicle controller and including limiting a rate of change of current flow of the electric machine in response to a rate of change of a driver demand torque. The method may include operating the engine at an operating point selected based on fuel consumption, current engine speed, the driver demand torque, and a state-of-charge of the traction battery. The method may also include controlling the current flow of the electric machine to provide an electric machine torque based on a difference between the driver demand torque and the engine torque associated with the operating point. The driver demand torque may correspond to an accelerator pedal position. The method may include retrieving the rate limit from a first lookup table in response to the rate of change of the driver demand torque being positive and retrieving the rate limit from a second lookup table in response to the rate of change of the driver demand torque being negative. The method may also include retrieving the rate limit from a lookup table in response to the magnitude of the rate of change of the driver demand torque and whether the rate of change of the driver demand torque is positive or negative.

Embodiments according to the present disclosure may provide associated advantages. For example, the present disclosure provides a system and method for managing energy management torque provided by an electric machine to allow for increased system efficiency by allowing fast changes in the energy torque to maintain the engine at an efficient operating point during corresponding fast changes in driver demand, while increasing the ability of the control system to smoothly manage powertrain mode transitions unaccompanied by changes in driver demand to avoid degradation in drivability while also reducing noise, vibration, and harshness (NVH).

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure could be desired for particular applications or implementations.

Figure 1:
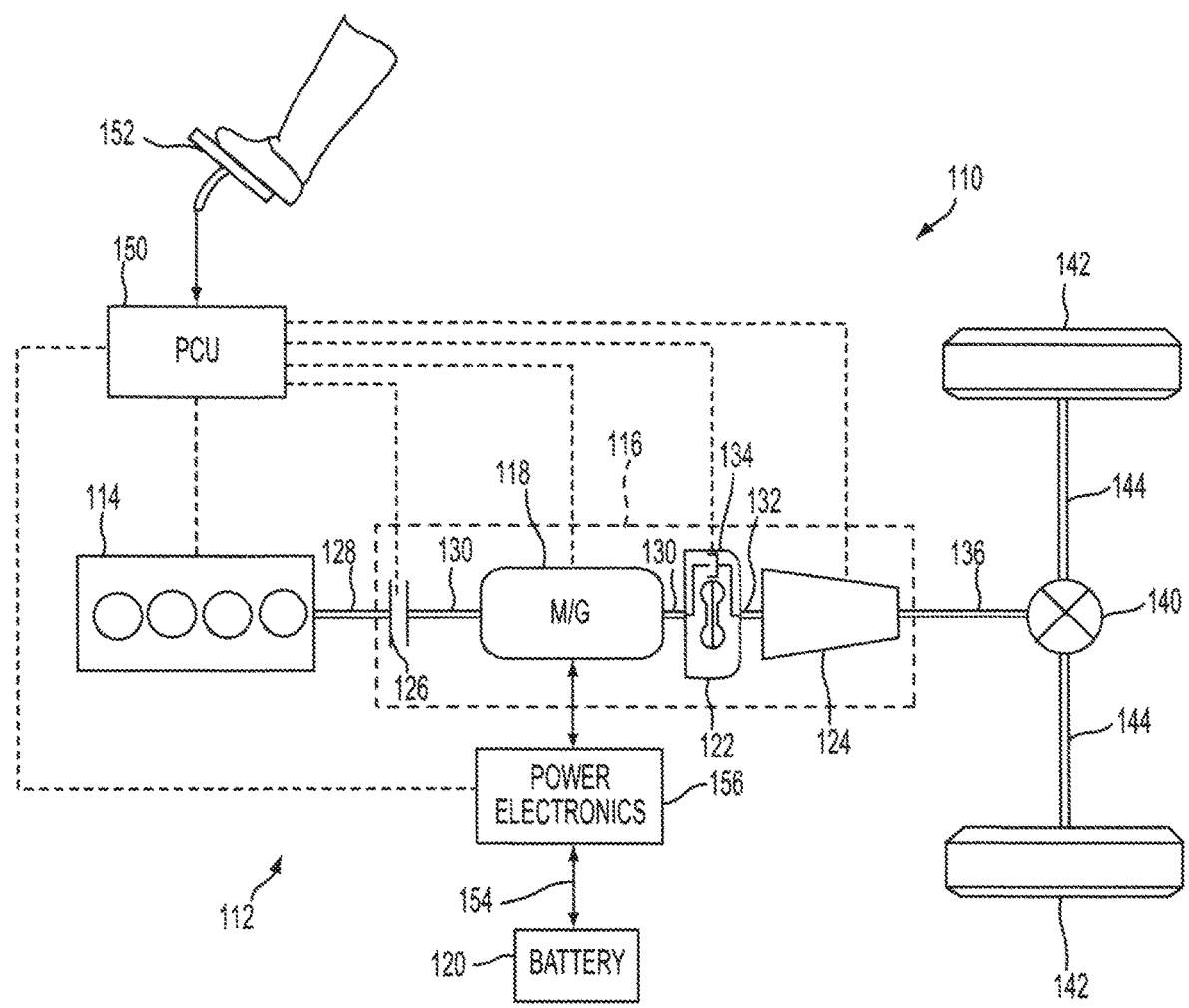
FIG. 1 is a schematic illustration of a hybrid electric vehicle having a modular powertrain configuration utilizing an energy management torque rate limit.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission system 116, which may be referred to as a modular hybrid transmission (WIT) system. As will be described in further detail below, in various embodiments, transmission system 116 may include an electric machine such as an electric motor/generator (M/G) 118, an associated traction battery 120, a torque converter 122, and a multiple step-ratio automatic transmission, or gearbox 124. Gearbox 124 may also be implemented by an automated mechanical transmission having one or more electric motors to select one of the multiple discrete gear ratios based on current vehicle and ambient operating conditions or modes.

The engine 114 and the electrical machine 118 are both drive sources for the vehicle 110. The engine 114 generally represents a power source that may include an internal combustion engine such as a gasoline, diesel, or natural gas powered engine, or a fuel cell. The engine 114 generates an engine power and corresponding engine torque that is supplied to the electric machine 118 when a disconnect clutch 126 (which may be referred to as an upstream clutch or first clutch) between the engine 114 and the electric machine 118 is at least partially engaged. The electric machine 118 may be implemented by any one of a plurality of types of electric machines, such as a permanent magnet synchronous motor, for example. Electric machine 118 may also be referred to as a traction motor as it can operate as an electric motor to provide torque to vehicle wheels 142. Power electronics 156 condition direct current (DC) power provided by the traction battery 120 to the requirements of the electric machine 118, as will be described below. For example, power electronics may provide three phase alternating current (AC) to the electric machine 118.

When the disconnect clutch 126 is at least partially engaged, power flow from the engine 114 to the electric machine 118 or from the electric machine to the engine 114 is possible. For example, the disconnect clutch 126 may be engaged and electric machine 118 may operate as a generator to convert rotational energy provided by a crankshaft 128 and electric machine shaft 130 into electrical energy to be stored in the traction battery 120. As described in greater detail below, electric machine 118 may operate as either a motor to increase torque provided to output shaft 136, or as a generator to decrease torque provided to output shaft 136, to allow engine 114 to operate at a desired engine speed and torque operating point to attain a particular system goal, such as fuel efficiency, for example. The disconnect clutch 126 can also be disengaged to isolate the engine 114 from the remainder of the powertrain 112 such that the electric machine 118 can act as the sole drive source for the HEV 110. Shaft 130 extends through the electric machine 118. The electric machine 118 is continuously drivably connected to the shaft 130, whereas the engine 114 is drivably connected to the shaft 130 only when the disconnect clutch 126 is at least partially engaged. When the disconnect clutch 126 is engaged, a fixed speed relationship exists between the speed of the engine 114 and the speed of the electric machine 118.

The electric machine 118 is connected to the torque converter 122 via shaft 130. The torque converter 122 is therefore connected to the engine 114 when the disconnect clutch 126 is at least partially engaged. The torque converter 122 includes an impeller fixed to electric machine shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch (also referred to as a downstream clutch or second clutch) to provide a smooth vehicle launch. Alternatively, or in combination, a launch clutch similar to disconnect clutch 126 may be provided between the electric machine 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch as previously described.

The gearbox 124 may include gear sets (not shown) that are selectively placed in different gear ratios by selective engagement of friction elements such as clutches and brakes (not shown) to establish the desired multiple discrete or step ratios between the input and output of the gear box 124. The friction elements are controllable through a shift schedule that connects and disconnects certain elements of the gear sets to control the ratio between an output shaft 136 and input shaft 132. The gearbox 124 is automatically shifted from one ratio to another based on various vehicle and ambient operating conditions by an associated controller, such as a powertrain control unit (PCU) 150. The gearbox 124 then provides powertrain output torque to output shaft 136. The gearbox 124 may be understood to provide a selectable fixed speed relationship between the speed of electric machine 118 and the speed of vehicle traction wheels 142.

It should be understood that the hydraulically controlled gearbox 124 used with a torque converter 122 is but one example of a gearbox or transmission arrangement. Any multiple ratio gearbox that accepts input torque from an engine and/or a motor and then provides torque to an output shaft at the different discrete ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated powertrain control unit (PCU) 150. While illustrated as one controller, the PCU 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, controlling current to operate electric machine 118 to provide wheel torque or charge battery 120, select or schedule transmission shifts, etc. Controller 150 may include a microprocessor or central processing unit (CPU) in communication with various types of non-transitory computer readable storage devices or media. Computer readable storage devices or media may include volatile and nonvolatile or persistent storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, electric machine, or various other vehicle systems and components.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 150 may communicate signals to and/or from engine 114, disconnect clutch 126, electric machine 118, launch clutch 134, transmission gearbox 124, and power electronics 156. Although not explicitly illustrated, those of ordinary skill in the art will recognize various functions or components that may be controlled by PCU 150 within each of the subsystems identified above. Representative examples of parameters, systems, and/or components that may be directly or indirectly actuated using control logic, code, or software algorithms executed by the controller to limit a rate of change of electric machine torque according to the disclosure include fuel injection timing, rate, and duration, throttle valve position (to control vacuum or manifold airflow for gas engine applications), spark plug ignition timing (for spark-ignition engines), intake/exhaust valve timing and duration, front-end accessory drive (FEAD) components such as an alternator, air conditioning compressor, battery charger, regenerative braking, power electronics, electric machine operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), electric machine current or torque, or traction battery state-of-charge, for example.

Control logic or functions performed by PCU 150 may be represented by flow charts or similar diagrams in one or more figures. These figures provide representative control strategies, algorithms, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a driver demanded torque, power, or drive command to propel the vehicle. In general, depressing and releasing the pedal 152 generates an accelerator pedal position signal that may be interpreted by the controller 150 as a demand for increased power or decreased power, respectively. Some vehicle applications and/or operating modes may determine driver demanded torque using inputs other than the pedal 152, such as when operating in cruise control, or when used in an autonomous vehicle application, for example. The controller 150 commands torque from the engine 114 and/or the electric machine 118 to provide the driver demand torque. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle with the engine 114, the disconnect clutch 126 is at least partially engaged to transfer at least a portion of the engine torque through the disconnect clutch 126 to the electric machine 118, and then from the electric machine 118 through the torque converter 122 and gearbox 124. The electric machine 118 may supplement or absorb torque produced by the engine 114 so that engine 114 may operate at or near a selected engine speed/torque operating point.

To drive the vehicle with the electric machine 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through wiring 154 to power electronics 156 that may include an inverter, for example. The power electronics 156 convert DC voltage from the battery 120 into AC voltage to be used by the electric machine. The PCU 150 commands the power electronics 156 to convert voltage from the battery 120 to an AC voltage provided to the electric machine 118 to provide positive or negative torque to the shaft 130. This operation mode may be referred to as an "electric only" operation mode.

In any mode of operation, the electric machine 118 may act as a motor and provide a driving force for the powertrain 112. Alternatively, the electric machine 118 may act as a generator and convert kinetic energy from the powertrain 12 into electric energy to be stored in the battery 120. The electric machine 118 may act as a generator while the engine 114 is providing propulsion power for the vehicle 110, for example. The electric machine 118 may additionally act as a generator during times of regenerative braking in which rotational energy from spinning wheels 142 is transferred back through the gearbox 124 and is converted into electrical energy for storage in the battery 120.

It should be understood that the schematic illustrated in FIG. 1 is merely representative and is not intended to be limiting. Other configurations are contemplated that utilize selective engagement of both an engine and a motor to transmit torque through the transmission. For example, the electric machine 118 may be offset from the crankshaft 128, an additional motor may be provided to start the engine 114, and/or the electric machine may be provided between the torque converter 122 and the gearbox 124. Other configurations are contemplated without deviating from the scope of the present disclosure.

When operating in hybrid mode, controller 150 may allocate a portion of driver power requests to engine 114 and a portion to electric machine 118 to operate engine 114 at an engine operating point selected based on a desired goal or parameter, such as overall system efficiency, lowest fuel consumption, battery charge sustaining, battery charge depletion, or battery charging modes, and/or a combination of one or more goals or parameters. For example, controller 150 may select an engine operating point that minimizes fuel consumption while providing battery charging, or that has higher fuel consumption and associated engine torque (and may include battery charging using excess engine torque) to maximize system efficiency. In other hybrid vehicle configurations, motor speed and engine speed may be controlled independently to allocate the driver power request among a motor and engine. In such configurations, a controller varies motor torque, motor speed, engine torque, and engine speed to accommodate the driver power request. In the configuration shown in FIG. 1, when disconnect clutch 126 is engaged for operation in hybrid mode, crankshaft 128 and shaft 130 rotate at a common speed.

As generally illustrated in FIG. 1 and explained in greater detail below, in one or more embodiments, vehicle 110 includes an engine 114, an electric machine 118 selectively coupled by a first clutch 126 to the engine 114, a step-ratio transmission 124 selectively coupled by a second clutch 134 to the electric machine 118, and a controller 150 programmed to operate the engine 114 at an operating point selected to maximize overall efficiency, or to achieve any other goal, such as minimizing engine fuel consumption. Those of ordinary skill in the art will recognize that increasing or maximizing overall system efficiency may result in higher fuel consumption by the engine 114 under some operating conditions relative to maximizing engine efficiency or minimizing engine fuel consumption based on losses associated with operating the electric machine 118. Controller 150 operates the electric machine 118 to provide an electric machine torque responsive to a difference between a driver demand torque and the engine torque associated with the selected operating point, and limits a rate of change of the electric machine torque in response to a rate of change of the driver demand torque. In one or more embodiments, the engine operating point determines a commanded engine torque based on current engine speed as determined by the current vehicle speed and selected transmission gear ratio.

Figure 2:
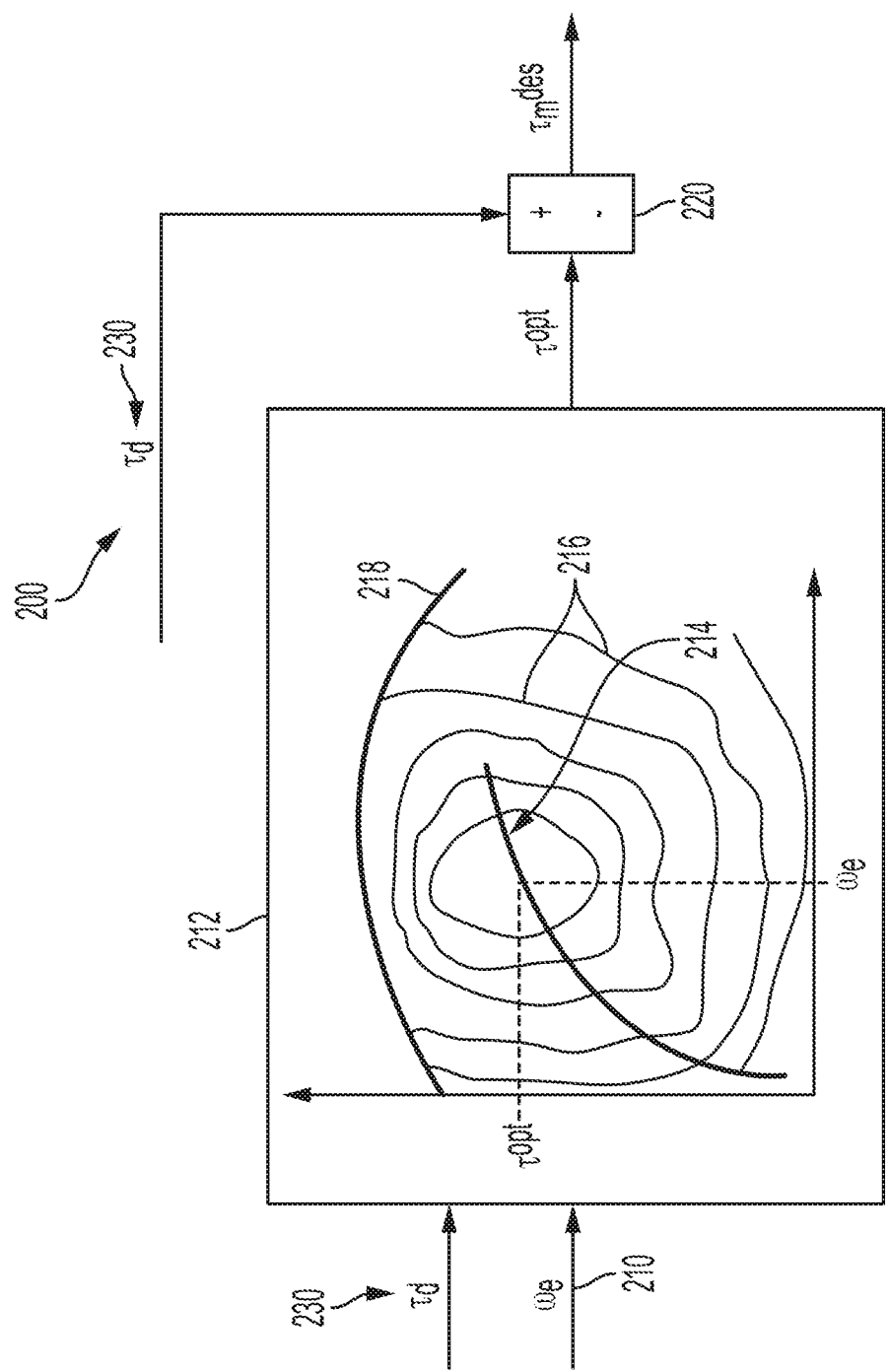
FIG. 2 illustrates a control strategy that selects an engine operating point and determines a desired energy management torque for the electric machine in response to driver demand.

Referring to FIGS. 1 and 2, control logic for controlling engine 114 and electric machine 118 is illustrated. A driver torque request $\tau_d$ is received as indicated at 200. The driver torque request $\tau_d$ 230 is equivalent to a driver power request divided by a current vehicle speed. The driver power request may correspond to position of an accelerator pedal 152, or may be generated automatically by controller 152 or another controller, such as when operating in cruise control, or when applied to an autonomous vehicle. A current engine speed $\omega_e$ is also received as indicated at 210. A corresponding engine torque $\tau^{opt}$ for the current engine speed $\omega_e$ and driver demanded torque 230 is obtained at operation 212 to achieve a desired system operating goal, such as minimizing engine fuel consumption, minimizing battery depletion, maximizing system efficiency, etc. Operation 212 may include retrieving a value from a lookup table stored in memory that represents a desired characteristic curve 214 calibrated to provide an engine torque $\tau^{opt}$ for the desired characteristic at a given engine speed $\omega_e$ where the engine speed is determined based on current vehicle speed and transmission gear ratio. The desired characteristic may be, for example, peak system efficiency or lowest fuel consumption, for example. The desired characteristic could also include reduced emissions, or various other characteristics, or a combination of characteristics.

For purposes of illustration, operation 212 is represented as a chart having operating zones of the engine including a plurality of system efficiency contours 216 bounded by a maximum engine torque curve 218. The desired characteristic curves and contours may be calibrated through vehicle testing, computer simulation, or other methods as appropriate. If the desired characteristic is system efficiency, the efficiency curves and contours will depend on an engine brake specific fuel consumption, motor efficiency map, battery state-of-charge (SOC), powertrain efficiency, and other factors. The operation may be embodied in a lookup table, equation, algorithm, or other methods. The selected engine torque $\tau^{opt}$ to approach or achieve the desired characteristic is then provided to operation 220. At operation 220, the difference between the engine torque $\tau^{opt}$ associated with the selected engine operating point and the driver torque request $\tau_d$ is determined. The resulting difference is the desired electric machine torque as represented by $\tau_m^{des}$. The engine 114 will be commanded to provide a desired engine torque $\tau_m^{des}$ equal to $\tau^{opt}$, and the electric machine 118 will be commanded to provide a torque equal to $\tau_m^{des}$. Any change in the electric machine torque may be rate limited based on a rate of change of the driver torque request as described in greater detail herein. The selected engine operating point may be adjusted or modified based on the battery state-of-charge (SOC). For example, an engine operating point having a torque higher than the driver demand torque may be selected to provide battery charging when SOC is below an associated threshold. Likewise, an engine operating point having a torque lower than the driver demand torque may be selected to further reduce fuel consumption or increase overall system efficiency when battery SOC exceeds an associated threshold.

Commanding the engine to provide the desired engine torque may include control of various vehicle systems or actuators depending on the particular type of engine. For example, for a spark-ignited gasoline engine, the controller may control a throttle valve to control vacuum or intake manifold airflow, spark ignition timing, fuel injection metering and timing, etc. For a compression-ignition diesel engine, the controller may control fuel injection metering and timing, etc. Commanding the electric machine to provide a desired energy management torque may include controlling current supplied from the battery to the electric machine operating as a motor to increase output torque, or controlling current supplied to the battery from the electric machine operating as a generator to decrease output torque.

Figure 3:
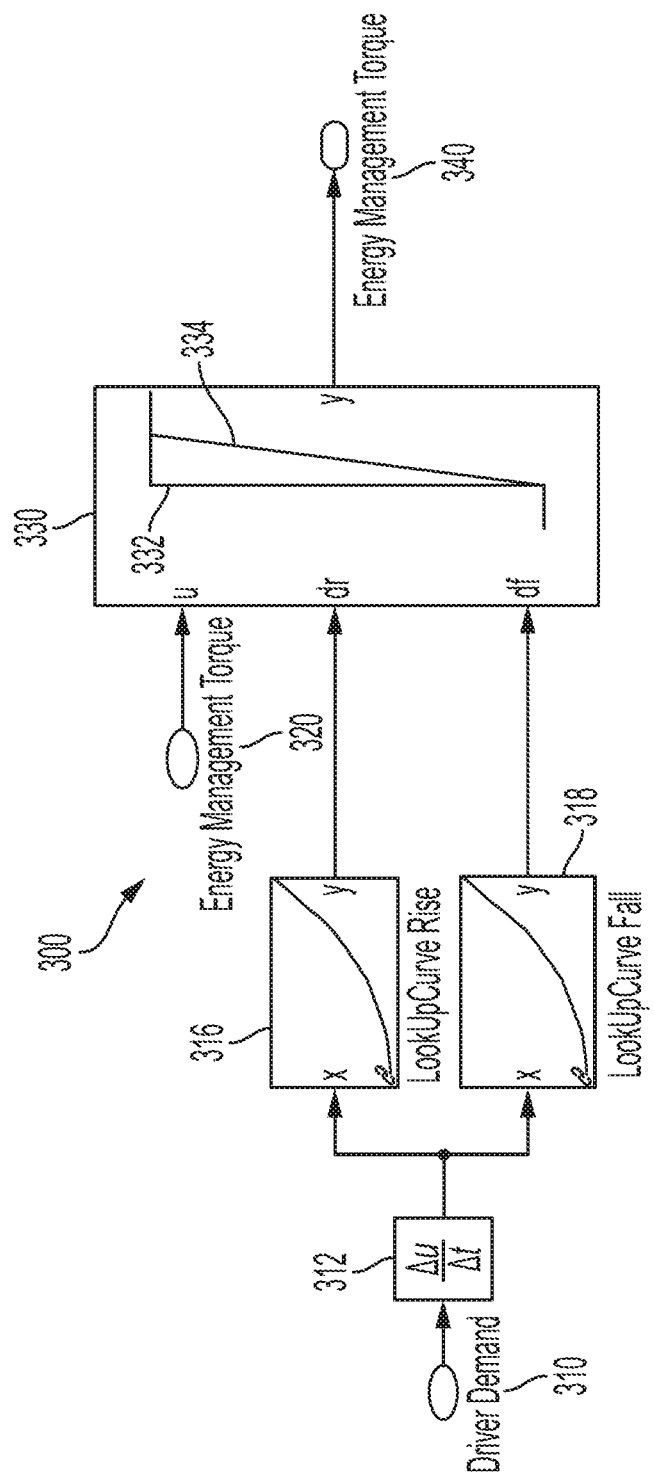
FIG. 3 illustrates operation of a system or method for dynamic rate limiting of energy management torque changes in response to a rate of change of driver demand.

FIG. 3 illustrates operation of a system or method for rate limiting a change in energy management torque provided by an electric machine based on a rate of change of driver demand torque according to various embodiments of the disclosure. System 300 receives the current driver demand torque at 310 and calculates a rate of change of the driver demand torque as represented at 312. This may include calculating a difference from a previous value divided by the elapsed time, calculating a first derivative of the driver torque values over a predetermined time, and or other mathematical or statistical operations to provide a measure of the rate of change of driver demand torque over a desired elapsed time, which may vary based on the particular implementation or application. The derivative or difference calculation or operation may also be used to provide an indication of whether the change in driver demand torque is increasing or decreasing. In one embodiment, the first derivative is calculated to provide a rate of change of driver demand torque with a positive value indicating that the torque is increasing and a negative value indicating that the torque is decreasing.

The rate of change of the driver demand torque is used to determine a rate limit for the engine management torque provided by the electric machine as generally represented at 316, 318. In the illustrated embodiment, the selected energy management torque rate limit may be different depending on whether the driver demand torque is increasing as represented at 316, or decreasing as represented at 318. In one embodiment a first lookup table 316 indexed by the rate of change of driver demand torque is used to retrieve the energy management torque rate limit if the driver demand torque is increasing, and a second lookup table 318 indexed by the rate of change of driver demand torque is used to retrieve the energy management torque rate limit if the driver demand torque is decreasing. Of course, lookup tables may be combined by adding another dimension indexed by whether the driver demand torque change is positive/increasing, or negative/decreasing. Similarly, an energy management torque rate limit may be calculated using an equation alone or by obtaining parameters from a lookup table for use in an equation to calculate a rate limit/threshold, such as done in extrapolation or interpolation, or more complex operations. Similarly, the rate limit may be selected from one of a plurality of discrete values, or may vary continuously in response to the rate of change of the driver demand torque.

The selected or calculated energy management torque rate limit is applied to the energy management torque 320 as represented at block 330. A representative rate limit applied to a step change as represented at 332 may result in a rate limited torque as represented at 334 and output as the rate limited energy management torque as represented at 340. The rate limited energy management torque is then used to command the torque output of the electric machine by controlling the electric machine current. As previously described, the energy management torque may be either positive to increase the output torque relative to the engine torque, or negative to decrease the output torque relative to the engine torque so that the engine operates at or near the selected engine torque and engine speed operating point.

The rate limit values stored within one or more lookup tables such as represented at 316, 318 may be used to provide a higher rate limit in response to faster changes in driver demand torque, while providing a lower rate limit in response to slower changes in driver demand torque. Similarly, the values may be calibrated to provide a threshold such that an energy management torque rate limit is applied only when the rate of change of driver demand torque is below the threshold. The threshold may represent steady state or slowly changing driver demand torque. When driver demand torque changes quickly, the corresponding values may provide a higher or unbounded rate limit so that the electric machine torque may quickly supplement the engine torque in an attempt to maintain the engine operating at the selected operating point. Representative system operation is illustrated and described with reference to FIGS. 5 and 6.

Figure 4:
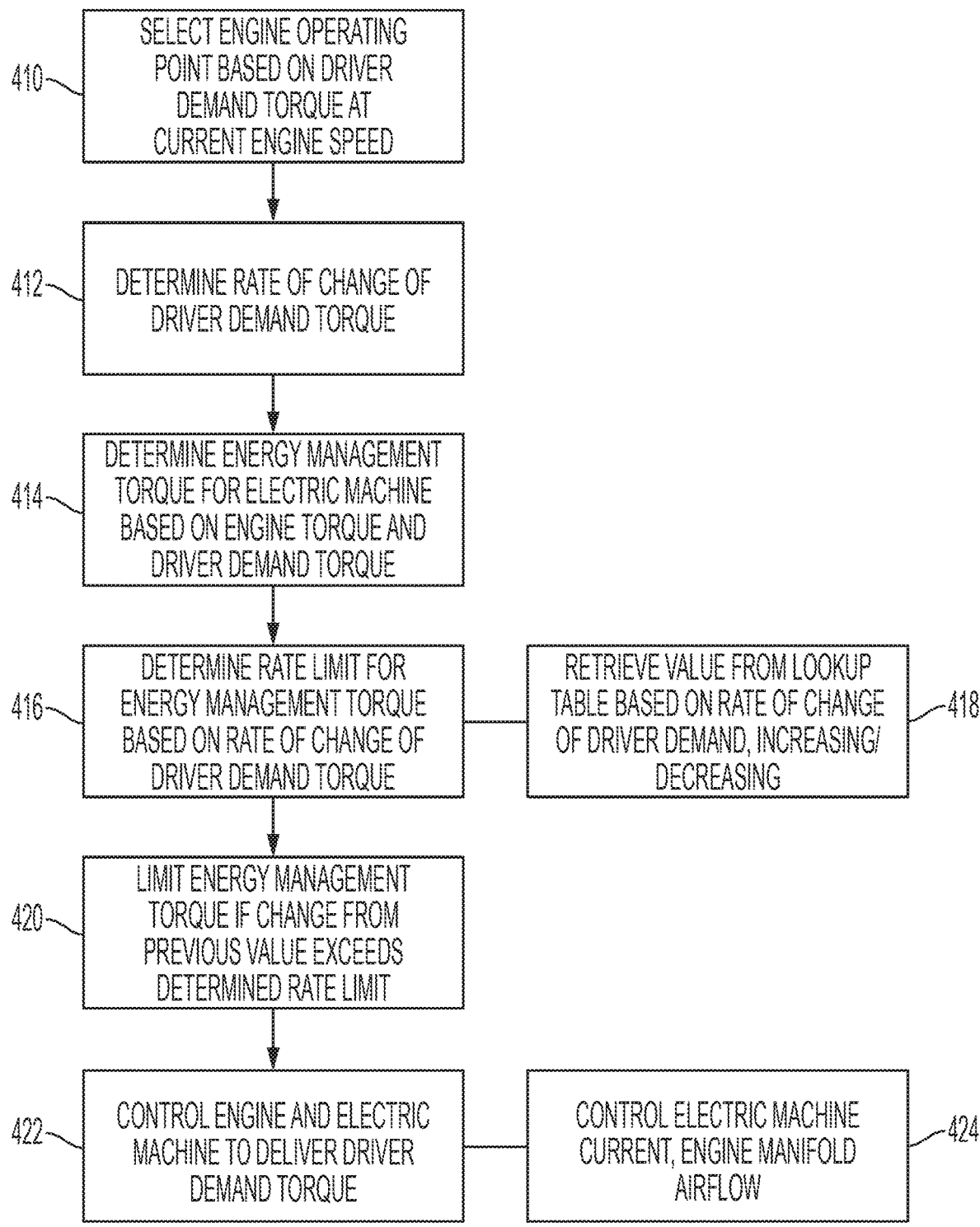
FIG. 4 illustrates operation of a system or method for dynamic rate limiting of energy management torque changes.

FIG. 4 illustrates operation of a representative system or method for controlling a vehicle according to various embodiments of the present disclosure. An engine operating point is selected to achieve a desired operating characteristic, such as system efficiency or fuel efficiency, based on current engine speed and driver demand torque as represented at 410. The driver demand torque may correspond to an accelerator pedal position as previously described. The rate of change of driver demand torque is determined as represented at 412. The rate of change may be determined by calculating the first derivative over a desired time period, or by dividing the difference between an initial value and final value by the elapsed time, for example. Block 412 may also include determining a direction of change as increasing/positive or decreasing/negative.

Energy management torque is then determined based on a difference between driver demand torque and the engine torque at the selected engine operating point as represented at 414. An energy management torque rate limit is determined based on the rate of change of the driver demand torque and optionally whether the driver demand torque is increasing or decreasing as represented at 416. The energy management torque rate limit may be retrieved from a lookup table based on the rate of change of the driver demand torque, and optionally also based on whether the driver demand torque is increasing or decreasing as represented at 418. In one embodiment, block 418 represents retrieving a first rate limit from a first lookup table in response to the rate of change of the driver demand torque being positive and retrieving the first rate limit from a second lookup table in response to the rate of change of the driver demand torque being negative.

The determined rate limit may then be applied to the energy management torque rate as represented at 420. In one embodiment, the energy management torque rate limit is applied when the rate of change of driver demand torque is below an associated threshold, which may be associated with a steady-state driver demand torque. The engine and electric machine are then controlled as represented at 422 to deliver the associated engine torque and energy management torque. As such, the engine may be operated at an operating point selected at 410 based on overall system efficiency or one or more contributing factors, such as fuel consumption, the driver demand torque, and optionally based on a state-of-charge of the traction battery. Engine control may include controlling engine manifold airflow while electric machine control may include controlling electric machine current as represented at 424.

As generally illustrated in FIGS. 1-4, a method for controlling a vehicle 110 having an engine 114, and an electric machine 118 coupled to a traction battery 120 may include, by a vehicle controller 150: limiting a rate of change of current flow of the electric machine 118 in response to a rate of change of a driver demand torque.

Having a fast rate limit or fast filter applied to energy management torque may result in large torque imbalances at the impeller of the torque converter. In general, the electric machine is capable of producing nearly instantaneous torque in response to a command whereas the engine torque response is limited by the airflow and fueling dynamics. When using a high rate limit or fast filter, this may result in mismatched delays in actuator torque delivery between the engine and the electric machine that may impact drivability and NVH. Using a slow filter or lower rate limit may result in the engine deviating from the desired operating point during transient impeller torque requests. Previous control strategies have selected a rate limit for energy management torque that attempted to balance these conflicting or competing attributes. Embodiments according to the present disclosure provide the ability to calibrate or tune the energy management torque rate limit to reduce drivability and NVH issues that may otherwise result from a compromise solution under some operating conditions.

Figure 5:
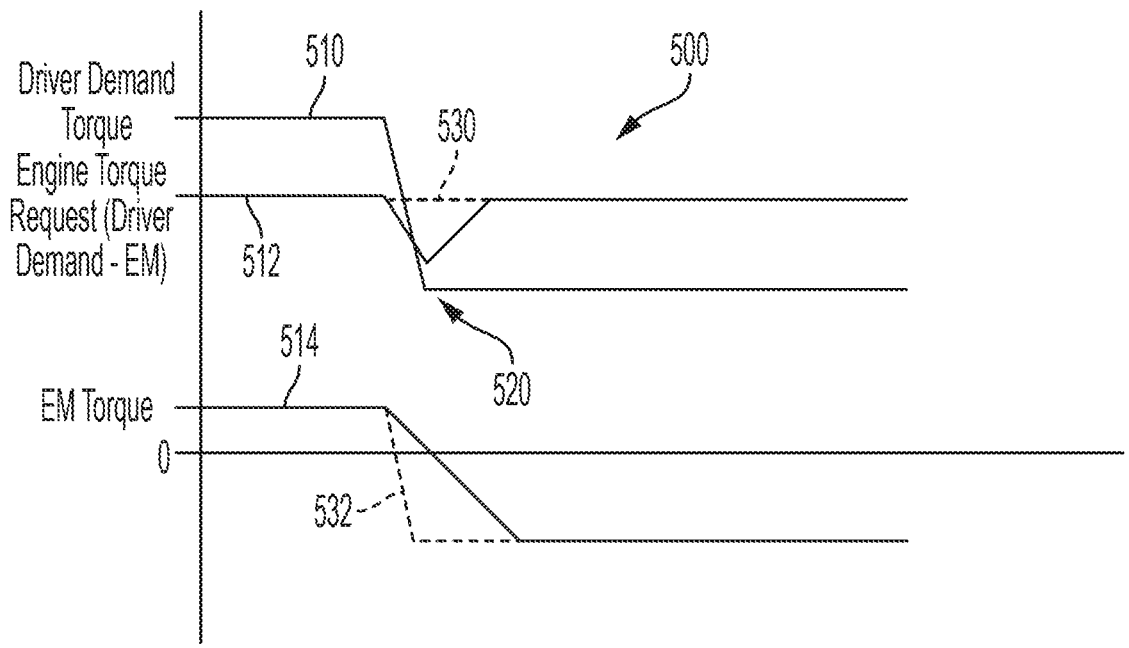
FIG. 5 illustrates operation of dynamic rate limiting of energy management torque relative to a previous strategy employing a slow filter for a rapid change in driver demand.

FIG. 5 illustrates operation of a representative system or method 500 for vehicle control according to the present disclosure in response to a rapid change in driver demand torque relative to a previous strategy that applied a slow filter or low rate limit to energy management torque. Driver demand torque is represented by line 510 with engine torque represented by lines 512, 530 and energy management torque represented by lines 514, 532. A rapid decrease in driver demand torque 510 results in a corresponding decrease to energy management torque 514. However, because the energy management torque has a low rate limit or slow filter, engine torque must also be reduced to meet the driver demand torque such that the engine deviates from the selected operating point and may also generate a powertrain torque disturbance at 520 when engine torque reverses direction. Use of a dynamic or selectable rate limit applied to the energy management torque according to embodiments of the present disclosure applies a higher rate limit in response to the higher rate of change of driver demand torque resulting in a faster reduction of energy management torque as represented at 532, which allows engine torque to remain relatively constant as represented at 530 to reduce or eliminate any noticeably powertrain torque disturbance.

Figure 6:
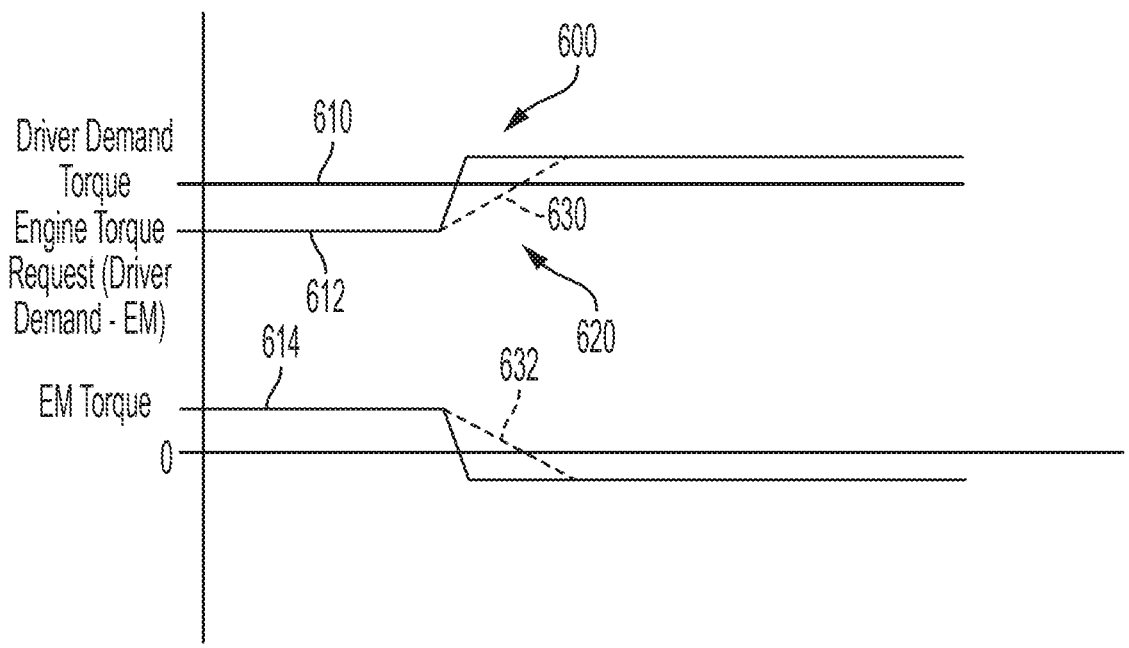
FIG. 6 illustrates operation of dynamic rate limiting of energy management torque relative to a previous strategy employing a fast filter for an operating mode change with steady driver demand.

FIG. 6 illustrates operation of a representative system or method 600 for vehicle control according to the present disclosure in response to a mode change with steady driver demand torque relative to a previous strategy that applied a fast filter or high rate limit to energy management torque. A representative operating mode change may be from battery charge depletion mode to charge sustaining mode or charging mode, for example. Other mode changes may include driver selection of an economy mode, a sport mode, or a normal mode, for example. Driver demand torque is represented by line 610 with engine torque represented by lines 612, 630 and energy management torque represented by lines 614, 632. Steady or unchanged driver demand 610 during a mode change may result in a corresponding decrease to energy management torque 614. However, because the energy management torque has a high rate limit or fast filter, the rapid reduction in energy management torque results in a corresponding increase in engine torque to maintain the driver demand torque such that the engine deviates from the selected operating point and may also generate a powertrain torque disturbance at 620. Use of a dynamic or selectable rate limit applied to the energy management torque according to embodiments of the present disclosure applies a lower rate limit in response to the lower rate of change of driver demand torque resulting in a slower reduction of energy management torque as represented at 632, which allows engine torque to more slowly increase as represented at 630 to reduce or eliminate any noticeable powertrain torque disturbance.

One or more embodiments according to the present disclosure may include associated advantages, such as operating the engine at an operating point to improve overall system efficiency while accommodating driver demand transients using engine management torque associated with the electric machine. Limiting the rate of change of energy management torque when unaccompanied by changes in driver demand provides smooth powertrain mode transitions to maintain acceptable drivability while reducing engine noise fluctuations otherwise associated with load changes due to engine/motor torque mismatch at steady driver demand.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, flash devices and/or other solid state storage devices. The processes, methods, or algorithms can also be implemented in a software executable object or code. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, firmware, and software components.

While representative embodiments are described above, it is not intended that these embodiments describe all possible forms encompassed by the claims. The words used in the specification are words of description rather than limitation, and it is understood that various changes can be made without departing from the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications or implementations.

What is claimed is:

1. A vehicle comprising:
an engine;
an electric machine selectively coupled by a first clutch to the engine;
a step-ratio transmission selectively coupled by a second clutch to the electric machine; and
a controller programmed to:
operate the engine at an engine torque associated with an operating point selected based on at least engine fuel efficiency and current engine speed;
operate the electric machine to provide an electric machine torque responsive to a difference between a driver demand torque and the engine torque associated with the operating point; and
limit a rate of change of the electric machine torque in response to a rate of change of the driver demand torque.

2. The vehicle of claim 1 wherein the controller is programed to retrieve an electric machine rate of change limit from a lookup table stored in a memory accessible by the controller based on the rate of change of the driver demand torque.

3. The vehicle of claim 2 wherein the lookup table includes a first value associated with the driver demand torque increasing and a second value associated with the driver demand torque decreasing.

4. The vehicle of claim 3 wherein the limit for the rate of change of the electric machine torque increases as the rate of change of the driver demand torque increases.

5. The vehicle of claim 3 wherein the controller is further programmed to limit the rate of change of the electric machine torque to a first rate in response to the rate of change of the driver demand torque being positive, and to limit the rate of change of the electric machine torque to a second rate in response to the rate of change of the driver demand torque being negative.

6. The vehicle of claim 1 wherein the controller is further programmed to limit the rate of change of the electric machine torque using a rate limit retrieved from a lookup table stored in a memory accessible by the controller and indexed by at least the rate of change of the driver demand torque, wherein the lookup table is selected based on whether the driver demand torque is increasing or decreasing.

7. The vehicle of claim 1 wherein the controller is further programmed to limit the rate of change of the electric machine torque by retrieving the rate limit from the lookup table based on the rate of change of the driver demand torque and whether the driver demand torque is increasing or decreasing.

8. The vehicle of claim 1 wherein the controller is further programmed to limit the rate of change of the electric machine torque by retrieving the rate limit from a first lookup table if the driver demand torque is increasing, and by retrieving the rate limit from a second lookup table if the driver demand torque is not increasing.

9. The vehicle of claim 1 wherein the second clutch comprises a torque converter clutch.

10. A vehicle comprising:
an engine;
a traction battery;
an electric machine selectively coupled by a first clutch to the engine and electrically coupled to the traction battery;

an automatic step-ratio transmission having a plurality of selectable discrete gear ratios, the transmission coupled to the electric machine; and a controller programmed to:

control at least engine manifold airflow to operate the engine at an engine torque associated with a selected engine operating point based at least in part on a driver demand torque and a state-of-charge of the traction battery;

control current flow to and from the electric machine to provide an electric machine torque responsive to a difference between the driver demand torque and the engine torque associated with the operating point; and limit a rate of change of the electric machine torque to:
a first rate in response to a rate of change of the driver demand torque being positive; and
a second rate in response to the rate of change of the driver demand torque being negative.

11. The vehicle of claim 10 wherein the controller is programmed to retrieve the first rate and the second rate from a lookup table stored in a memory in communication with the controller.

12. The vehicle of claim 11 wherein the lookup table is indexed by the rate of change of the driver demand torque.

13. The vehicle of claim 12 further comprising an accelerator pedal, wherein the driver demand torque corresponds to a position of the accelerator pedal.

14. The vehicle of claim 10 wherein the controller is programmed to retrieve the first rate from a first lookup table in response to the rate of change of the driver demand torque being positive, and to retrieve the second rate from a second lookup table in response to the rate of change of the driver demand torque being negative.

15. A method for controlling a vehicle having an engine, and an electric machine coupled to a traction battery, the method comprising, by a vehicle controller:

operating the engine at an engine torque operating point selected based on system efficiency, a driver demand torque, and a current engine speed; and limiting a rate of change of current flow of the electric machine in response to a rate of change of the driver demand torque.

16. The method of claim 15 further comprising, by the vehicle controller:

operating the engine at an operating point selected based on fuel consumption, the driver demand torque, and a state-of-charge of the traction battery.

17. The method of claim 16 further comprising, by the vehicle controller:

controlling the current flow of the electric machine to provide an electric machine torque based on a difference between the driver demand torque and the engine torque associated with the operating point.

18. The method of claim 17 wherein the driver demand torque corresponds to an accelerator pedal position.

19. The method of claim 15 further comprising, by the vehicle controller:

retrieving a rate limit from a first lookup table in response to the rate of change of the driver demand torque being positive; and retrieving the rate limit from a second lookup table in response to the rate of change of the driver demand torque being negative.

20. The method of claim 15 further comprising, by the vehicle controller:

retrieving a rate limit from a lookup table based on magnitude of the rate of change of the driver demand torque and whether the rate of change of the driver demand torque is positive or negative.

* * * * *